United States Patent Office 3,551,291
Patented Dec. 29, 1970

3,551,291
METHOD FOR OBTAINING MESOTHELIAL CELLS
Eugene M. J. Pugatch, 11 Amherst Road,
Stoughton, Mass. 02072
No Drawing. Filed May 20, 1969, Ser. No. 826,257
Int. Cl. A61m 37/00
U.S. Cl. 195—1.7
3 Claims

ABSTRACT OF THE DISCLOSURE

A method for removing mesothelial cells from supportive tissue by first partially drying the mesothelial surface, applying thereto a dry water absorptive polymeric film, and thereafter stripping said film from the mesothelial surface and thereby removing a layer of mesothelial cells.

---

The present invention is directed to a method of obtaining a substantially homogeneous layer of mesothelial cells from membranes such as the lining of the pleural, pericardial and peritoneal cavities. Prior to the present invention, it was extremely difficult to otbain substantially homogeneous layers of mesothelial cells, i.e., layers of mesothelial cells substantially free of other extraneous cell types, particularly the cell type of the tissue supporting the mesothelium. The most commonly employed method consists of scraping the surface of the membrane to remove the mesothelial cells. However, this is generally undesirable as it removes not only the mesothelial cells but the underlying cell types as well and usually disrupts the cells. The only method previously known for obtaining mesothelial cells substantially free of other cell types is the "frozen hautchen" method. In this method cells are obtained by pressing the desired cell layer, such as a cell surface comprised of mesothelial cells, against a glass slide that is laying on the freezing head of a freezing microtome. After the freezing process has reached the appropriate stage, the mesothelium is firmly attached to the slide and the rest of the structure can be pulled away from it. This method has several drawbacks.

(1) The amount of mesothelial tissue collected by such method is extremely small, i.e., up to about 1 cm.$^2$.

(2) The cells are frozen and thereby cannot be used as seed cells for a tissue culture or for any other purpose where live mesothelial cells are desired.

The present invention on the other hand can be employed to remove large amounts of mesothelial cells from the membranes lining the body cavities previously mentioned. In addition, the mesothelial cells are obtained substantially free of extraneous cell types, i.e., cell types other than mesothelial cells such as the cell types of the tissue supporting the mesothelial cells. Not only can large numbers of mesothelial cells thus be collected but the cells can be removed from the surface of the polymeric film without destroying the tissue thereby allowing individual cells or clones to be employed as seeds for tissue cultures. Furthermore, the whole cell layer can be removed from the polymeric film and layered on a proper substrate in the proper nutrient media to establish a tissue culture which need not grow from the seed cells. In other operations the harvest of mesothelial cells substantially free of extraneous cell types serves as a source of mesothelial cells for isolation of various chemical substances believed to exist in mesothelial cells.

The method of the present invention comprises removing excess water from the mesothelial surface and thereafter bringing the mesothelial surface and a dry water absorptive polymeric film into intimate contact. The film is then stripped away pulling a layer of mesothelial cells away from its support tissue. The mesothelial cells thus separated from the supporting cell layer are substantially free of other cell types. The mesothelial cells thus obtained can be removed from the surface of the polymeric film by a variety of means depending on the manner in which the cells are to be employed.

Before bringing the mesothelial surface into contact with the polymeric film it is desirable to wash the mesothelial surface to remove blood, etc. The surface is then partially dried to remove excess water. The partially dried surface is wet to the touch but the amount of moisture is generally not sufficient to "run-off." If mesothelial surface is not partially dried the excess water decreases the adhesion between the mesothelial surface and the polymeric film. It is believed that the moisture remaining on the partially dried mesothelial surface is rapidly absorbed by the polymeric film and thus forms a bond between the damp cell membrane and the film. Representative polymeric materials include cellulose polyacetate membranes, gelatin, ethyl cellulose, cellulose nitrate, cellulose acetate butyrate, celulose propionate, casein films, vinyl butyral or other plastic films leaving a water absorption value (ASTM D 570–63T) of from about 2 to 14 or more. The film should be chemically inert with respect to the tissue components and the various additives such as plasticizers, curing agents, catalysts, etc. should not be easily leached out by aqueous media. Thus, films having received FDA approval for use with foods and/or pharmaceuticals should provide adequate protection against contamination. The film may be unsupported such as in the case of the cellulose polyacetate membranes or may be conveniently carried on a supporting member such as a sheet of paper or other flexible substrate.

When the harvested mesothelial cells are to be disrupted in order to obtain the cell contents the means by which the cells are removed from the surface of the polymeric membrane is not critical and a variety of techniques can be employed such as subjecting the polymeric film and adherent tissue to ultrasonic vibrations or stirring or agitation with a mechanical stirring device or shaker. If the cells are to be employed in tissue culture, the film and adherent cells can be soaked in the appropriate aqueous medium or nutrient broth and gently lifted from the surface of the polymeric film when the moisture medium or broth has sufficiently decreased the adhesion between the mesothelial cells and the polymeric film. In another embodiment, the polymeric film is placed in a tissue culture growth media and the cells allowed to grow on the surface of the film used to remove the mesothelial cells from their supportive tissue. This method eliminates any disruption in the cell layer continuity which might be caused by removing the mesothelial cell layer from the surface of the polymeric film.

SPECIFIC EMBODIMENT

At a slaughterhouse, mesothelium lining the parietal peritoneum of the abdomen and visceral pleura of the lungs of freshly slaughtered cattle was washed free of blood in situ by means of gentle spraying with tap water. The washed mesothelial lining was dabbed dry of excess moisture with absorbent tissue; thereafter, 5 cm. by 20 cm. strips of cellulose polyacetate membrane (Oxoid, Oxo Ltd.) were pressed against the mesothelial surface and then pulled away bringing a layer of mesothelial cells and little else with them. Aortae and portal veins from the same animals were excised within a few minutes of death, trimmed of adventitial fat (in the case of the aortae) and slit open longitudinally. The interior endothelial linings of these great vessels were washed free of blood and dabbed gently with absorbent tissues. The endothelium from these vessels was then stripped with the cellulose polyacetate membrane strips as previously described. The strips of cellulose polyacetate with their adherent layers of mesothelial or endothelial cells harvested from pleura, peritoneum and blood vessels were placed in separate plastic containers, each of which was surrounded by Dry Ice to keep the tissue cold until it could be processed further.

The cell-laden cellulose polyacetate strips were cut into small pieces of about one square inch in area, and placed into separate beakers, each of which contained 400 ml. of ice-cold phosphate buffer saline at a pH of 7.3. The beakers were then removed to a cold room at 4° C. and the cellular material was liberated from the cut up strips by means of gentle agitation with magnetic stirrers for eighteen hours. This procedure resulted in the production of richly turbid, pale-while cell suspensions.

The cell suspensions thus obtained can be subjected to ultrasonic vibrations to disrupt the cells and centrifuged at the appropriate speeds, well known to those skilled in the art, to separate various cellular components such as cell nuclei, mitochondria, microsomes and the like.

In the present specification and claims the term "mesothelium" refers to the cells of single squamous epithelium lining such body cavities as the pleural, pericardial, and peritoneal cavities. The mesothelium can be conveniently obtained from the carcasses of mammals such as cattle, horses, dogs, swine, sheep, human cadavers, various anthropoid apes and the like.

I claim:

1. A method of stripping mesothelial cells from supportive tissue, said method comprising partially drying the mesothelial surface and bringing the mesothelial surface and the surface of a dry water absorptive polymeric film into intimate contact and pulling the polymeric film and its adherent mesothelial cells away from the tissue.

2. The method claimed in claim 1 wherein the mesothelial cells are washed from the surface of the polymeric film.

3. The method of claim 1 wherein the polymeric film is cellulose polyacetate.

References Cited

UNITED STATES PATENTS 2,969,057    1/1961    Simmons _____ 128—2

RICHARD L. HUFF, Primary Examiner